United States Patent
Uemura et al.

(10) Patent No.: US 7,671,135 B2
(45) Date of Patent: Mar. 2, 2010

(54) POLAR MONOMER-OLEFIN COPOLYMER AND PROCESS FOR PRODUCING THE SAME

(75) Inventors: Makoto Uemura, Ichihara (JP); Masayuki Fujita, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/341,622

(22) Filed: Jan. 30, 2006

(65) Prior Publication Data

US 2006/0223944 A1 Oct. 5, 2006

(30) Foreign Application Priority Data

Mar. 31, 2005 (JP) .................. 2005-101702

(51) Int. Cl.
*C08F 210/02* (2006.01)
*C08F 220/06* (2006.01)

(52) U.S. Cl. ...................... 525/242; 525/301

(58) Field of Classification Search ............. 525/242
See application file for complete search history.

(56) References Cited

U.S. PATENT DOCUMENTS 5,527,751 A 6/1996 Inamatsu et al.
5,763,548 A * 6/1998 Matyjaszewski et al. ..... 526/135
6,479,425 B1 * 11/2002 Stibrany et al. ............. 502/165

FOREIGN PATENT DOCUMENTS

JP 3390523 1/2003
WO WO 03/042254 A1 5/2003

OTHER PUBLICATIONS

Majcher et al, "Copolymerization of Methyl Acrylate and ethyl Methacrylate with α-olefin in the presence of Sc(OTf)3", Polymer Preprints, 2004, vol. 45, No. 2, pp. 707-708.*
Majcher, Megan L., "Copolymerization of Methyl Acrylate and Methyl Methacrylate with α-Olefins in the Presence of Sc(OTf)$_3$", Polymer Preprints, 2004, vol. 45, No. 2, pp. 707-708.

* cited by examiner

*Primary Examiner*—Vasu Jagannathan
*Assistant Examiner*—Karuna P Reddy
(74) *Attorney, Agent, or Firm*—Foley & Lardner LLP

(57) ABSTRACT

A polar monomer-olefin copolymer comprising a polar monomer unit in an amount of 50 to 75% by mol and an olefin unit in an amount of 25 to 50% by mol, and containing a chain structure consisting of two or more olefin units; a process for producing said copolymer comprising the step of radically copolymerizing 100 parts by mol of an olefin with 1 to 100 parts by mol of a polar monomer; and a process for producing said copolymer comprising the step of radically copolymerizing an olefin having a concentration in a polymerization reactor of 0.04 to 100 mol/liter with a polar monomer having a concentration therein of 0.01 to 25 mol/liter.

9 Claims, No Drawings

POLAR MONOMER-OLEFIN COPOLYMER AND PROCESS FOR PRODUCING THE SAME

FIELD OF THE INVENTION

The present invention relates to a polar monomer-olefin copolymer comprising a polar monomer unit and an olefin unit, and a process for producing said copolymer.

BACKGROUND OF THE INVENTION

In these years, there have been developed various polar monomer-olefin copolymers for various purposes, which copolymers have characteristics of both polymers; namely, characteristics of a polar monomer polymer represented by a methacrylic polymer such as transparency and a weather resistance, and characteristics of an olefin polymer such as a water resistance.

As a polar monomer-olefin copolymer, POLYMER PREPRINTS, vol. 45, pages 707-708 (2004) discloses a methyl acrylate-1-alkene alternating copolymer containing a methyl acrylate unit and a 1-alkene unit in nearly the same molar amount as each other.

SUMMARY OF THE INVENTION

However, there is a problem in that the above-mentioned methyl acrylate-1-alkene alternating copolymer does not completely have characteristics of both polymers of a methyl acrylate polymer and a 1-alkene polymer, and therefore, there has been required a copolymer having more well-balanced characteristics thereof.

In view of the above-mentioned problem in the conventional art, the present invention has an object to provide a polar monomer-olefin copolymer having well-balanced characteristics of both polymers of a polar monomer polymer and an olefin polymer, and a process for producing said copolymer.

The present invention is a polar monomer-olefin copolymer, which:
  comprises a polar monomer unit in an amount of 50 to 75% by mol, and an olefin unit in an amount of 25 to 50% by mol, the total amount of both units being 100% by mol; and
  contains a main chain structure consisting of two or more olefin units.

Also, the present invention is a process for producing a polar monomer-olefin copolymer, which:
  comprises a polar monomer unit in an amount of 50 to 75% by mol, and an olefin unit in an amount of 25 to 50% by mol, the total amount of both units being 100% by mol; and
  contains a main chain structure consisting of two or more olefin units;
the process comprising the step of radically copolymerizing 100 parts by mol of an olefin with 1 to 100 parts by mol of a polar monomer. This process is hereinafter referred to as "process-1".

Further, the present invention is a process for producing a polar monomer-olefin copolymer, which:
  comprises a polar monomer unit in an amount of 50 to 75% by mol, and an olefin unit in an amount of 25 to 50% by mol, the total amount of both units being 100% by mol; and
  contains a main chain structure consisting of two or more olefin units;
the process comprising the step of radically copolymerizing an olefin having an initial concentration in a polymerization reactor of 0.04 to 100 mol/liter with a polar monomer having an initial concentration therein of 0.01 to 25 mol/liter. This process is hereinafter referred to as "process-2", and the above-mentioned process-1 and process-2 are collectively referred to as "process of the present invention".

In the present invention, the terms "polar monomer unit" and "olefin unit" mean a unit of a polymerized polar monomer and a unit of a polymerized olefin, respectively. Accordingly, when a polar monomer is, for example, methyl acrylate ($CH_2$=$CHCOOCH_3$), a polar monomer unit is a divalent monomer unit of —$CH_2$—$CH(COOCH_3)$—, and when an olefin is, for example, ethylene ($CH_2$=$CH_2$), an olefin unit is a divalent monomer unit of —$CH_2$—$CH_2$—.

DETAILED DESCRIPTION OF THE INVENTION

A polar monomer in the present invention means a cyclic or chain organic compound having 3 to 20 carbon atoms, which contains a carbon-to-carbon double bond (C=C) conjugating with a carbonyl or cyano group. Said organic compound may contain one or more substituent groups such as a carbonyl group other than the above-mentioned carbonyl group, a cyano group other than the above-mentioned cyano group, an amino group, a hydroxyl group and a halogeno group.

Examples of the polar monomer are acrylic acid, an acrylic ester, methacrylic acid, a methacrylic ester, acrylamide, methacrylamide, an N-alkylacrylamide, an N-alkylmethacrylamide, an N,N-dialkylacrylamide, an N,N-dialkylmethacrylamide, acrylonitrile, methacrylonitrile, acrolein, methacrolein, and methyl vinyl ketone; and a combination of two or more thereof. Among them, preferred is an acrylic ester.

Examples of the above-mentioned acrylic ester are an alkyl acrylate such as methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, isopentyl acrylate, sec-pentyl acrylate, tert-pentyl acrylate, neopentyl acrylate, cyclopentyl acrylate, n-hexyl acrylate, cyclohexyl acrylate, n-heptyl acrylate, n-octyl acrylate, 2-ethylhexyl acrylate, nonyl acrylate, decyl acrylate, dodecyl acrylate, isobornyl acrylate, dicyclopentyl acrylate, menthyl acrylate, noradamantyl acrylate, and adamantly acrylate; an aryl acrylate such as phenyl acrylate, and tolyl acrylate; benzyl acrylate; 2-methoxyethyl acrylate; 3-methoxybutyl acrylate; 2-hydroxyethyl acrylate; 2-hydroxypropyl acrylate; stearyl acrylate; glycidyl acrylate; 2-aminoethyl acrylate; γ-(acryloyloxypropyl) trimethoxysilane; γ-(acryloyloxypropyl) dimethoxymethylsilane; an adduct of ethylene oxide to acrylic acid; trifluoromethylmethyl acrylate; 2-trifluoromethylethyl acrylate; 2-perfluoroethylethyl acrylate; 2-perfluoroethyl-2-perfluorobutylethyl acrylate; 2-perfluoroethyl acrylate; perfluoromethyl acrylate; diperfluoromethylmethyl acrylate; 2-perfluoromethyl-2-perfluoroethylmethyl acrylate; 2-perfluorohexylethyl acrylate; 2-perfluorodecylethyl acrylate; and 2-perfluorohexadecylethyl acrylate. Among them, preferred is an alkyl acrylate, and more preferred is methyl acrylate.

Examples of the above-mentioned methacrylic ester are an alkyl methacrylate such as methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, isopentyl methacrylate, sec-pentyl methacrylate, tert-pentyl methacrylate, neopentyl methacrylate, cyclopentyl methacrylate, n-hexyl methacrylate, cyclohexyl methacrylate, n-heptyl methacrylate, n-octyl methacrylate, 2-ethylhexyl methacrylate, nonyl methacrylate, decyl methacrylate, dodecyl methacrylate, isobornyl methacrylate, dicyclopentyl methacrylate, menthyl methacrylate, noradamantyl methacrylate, and adamantyl methacrylate; an aryl methacrylate such as phenyl methacrylate, and tolyl methacrylate; benzyl methacrylate; 2-methoxyethyl methacrylate; 3-methoxybutyl methacrylate; 2-hydroxyethyl methacrylate; 2-hydroxypropyl methacrylate; stearyl methacrylate; glycidyl methacrylate; 2-aminoethyl methacrylate; γ-(methacryloyloxypropyl) trimethoxysilane; γ-(methacryloyloxypropyl) dimethoxymethylsilane; an adduct of ethylene oxide to methacrylic acid; trifluoromethylmethyl methacrylate; 2-trifluoromethylethyl methacrylate; 2-perfluoroethylethyl methacrylate; 2-perfluoroethyl-2-perfluorobutylethyl methacrylate; 2-perfluoroethyl methacrylate; perfluoromethyl methacrylate; diperfluoromethylmethyl methacrylate; 2-perfluoromethyl-2-perfluoroethylmethyl methacrylate; 2-perfluorohexylethyl methacrylate; 2-perfluorodecylethyl methacrylate; and 2-perfluorohexadecylethyl methacrylate; and a combination of two or more thereof.

Examples of the above-mentioned N-alkylacrylamide are N-methylacrylamide, N-ethylacrylamide, N-isopropylacrylamide, and N-phenylacrylamide, and a combination of two or more thereof.

Examples of the above-mentioned N,N-dialkylacrylamide are N,N-dimethylacrylamide, N,N-diethylacrylamide and N,N-diphenylacrylamide, and a combination of two or more thereof.

Examples of the above-mentioned N-alkylmethacrylamide are N-methylmethacrylamide, N-ethylmethacrylamide, N-phenylmethacrylamide, and N-isopropylmethacrylamide, and a combination of two or more thereof.

Examples of the above-mentioned N,N-dialkylmethacrylamide are N,N-dimethylmethacrylamide, N,N-diethylmethacrylamide and N,N-diphenylmethacrylamide, and a combination of two or more thereof.

An olefin in the present invention means a $C_2$ to $C_{20}$ cyclic or chain olefin containing a radically polymerizable carbon-to-carbon double bond. The olefin may contain (i) one or more substituent groups such as a carbonyl group, a cyano group, an amino group, a hydroxyl group and a halogeno group, or (ii) one or more bonds such as an ether bond, as long as the carbon-to-carbon double bond contained in the olefin does not conjugate with a functional group having π electrons, or does not make a direct linkage with a hetero atom such as an oxygen atom, a nitrogen atom and a sulfur atom, such as a vinyl ether linkage ($CH_2$=CH—O—). The olefin may be a combination of two or more kinds of olefins.

Examples of the olefin as a hydrocarbon compound are ethylene; an α-olefin such as propylene, 1-butene, 1-pentene, 1-hexene, 3-methyl-1-pentene, 3-ethyl-1-pentene, 4-methyl-1-pentene, 1-octene, 1-decene, 1-dodecene, 1-tetradecene, vinylcyclohexane, isobutene, 2-methyl-1-butene, 2-methyl-1-pentene, and 2,4,4-trimethyl-1-pentene; methylidenecyclohexane; ethylidenecyclohexane; limonene; pinene; carene; and camphene.

Examples of the olefin as a carbonyl group-containing compound are ally acetate, β-vinyl-γ-lactone, methyl allyl ketone, allyl aldehyde (acrolein), allylamide, N-acetylallylamide, and N-allylacetamide.

An example of the olefin as a cyano group-containing compound is 3-propene-1-nitrile.

An example of the olefin as an amino group-containing compound is allylamine.

Examples of the olefin as a hydroxyl group-containing compound are ally alcohol and homoally alcohol.

An example of the olefin as a halogeno group-containing compound is allyl chloride.

Examples of the olefin as an ether bond-containing compound are methyl ally ether, phenyl ally ether, allyl glycidyl ether, and limonene oxide.

Among olefins mentioned above, preferred is ethylene or an α-olefin.

In the present invention, the above-mentioned respective amounts of a polar monomer unit, an olefin unit, and a main chain structure consisting of two or more olefin units are measured according to a $^{13}C$-nuclear magnetic resonance ($^{13}C$-NMR) analysis comprising the steps of:

(1) preparing a solution of a polar monomer-olefin copolymer in chloroform-d having a concentration of 50 mg/mL;

(2) analyzing the solution at a temperature within a range of 20 to 45° C. with a $^{13}C$-NMR apparatus having a trade name, EXCULIBER/270 MHz, manufactured by JEOL. Ltd., thereby obtaining a $^{13}C$-NMR spectrum;

(3) identifying respective peaks in the $^{13}C$-NMR spectrum corresponding to the following chain structures (a) to (e);

(a) P-P-P,
(b) O-P-P and P-P-O,
(c) O-P-O,
(d) P-O-O and O-O-P, and
(e) O-O-O, wherein "P" means a polar monomer unit, and "O" means an olefin unit, (4) measuring peak areas of the respective peaks;

(5) dividing the respective peak areas by the number of carbon atoms assigned to the respective peaks, thereby obtaining the respective peak areas per one carbon atom, Aa, Ab, Ac, Ad and Ae, which correspond to the above-mentioned chain structures (a) to (e), respectively;

(6) assigning the values Aa to Ae to the following formulas [1] and [2], thereby obtaining an amount of an olefin unit and an amount of a main chain structure consisting of two or more olefin units; and $$\text{amount of an olefin unit}(\% \text{ by mol}) = (Ab/2 + Ac + Ad/2 + Ae) \times \quad [1]$$
$$100/(Ac + Ab + Aa + Ab/2 + Ac + Ad/2 + Ae),$$

and $$\text{amount of a main chain structure} \quad [2]$$
$$\text{consisting of two or more olefin units}(\% \text{ by mol}) =$$
$$(Ad + Ae) \times 100/(Ac + Ab + Aa + Ab/2 + Ac + Ad)$$

(7) obtaining an amount of a polar monomer unit from the following formula [3], $$\text{amount of a polar monomer unit}(\% \text{ by mol}) = \quad [3]$$
$$100 - \text{amount of an olefin unit}$$

The following is an example of the above-mentioned $^{13}C$-NMR analysis, the steps (1) to (3), of a methyl acrylate-ethylene copolymer:

(1) preparing a solution of a methyl acrylate-ethylene copolymer in chloroform-d having a concentration of 50 mg/mL;

(2) analyzing the solution at 22° C. with a $^{13}$C-NMR apparatus having a trade name, EXCULIBER/270 MHz, manufactured by JEOL Ltd., thereby obtaining a $^{13}$C-NMR spectrum; and (3) identifying the following respective peaks in the $^{13}$C-NMR spectrum, wherein "M" means a methyl acrylate unit and "E" means an ethylene unit;

(a) a peak at nearly 41.4 ppm derived from the methine carbon atom bonding to the ester group (—COOCH$_3$), which corresponds to the chain structure, M-M-M, (b) a peak at nearly 43.2 ppm derived from the methine carbon atom bonding to the ester group (—COOCH$_3$), which corresponds to the chain structures, E-M-M and M-M-E, (c) a peak at 45.2 ppm derived from the methine carbon atom bonding to the ester group (—COOCH$_3$), which corresponds to the chain structure, E-M-E, (d) two peaks at nearly 27.0 ppm and nearly 29.3 ppm derived from respective β- and γ-position methylene carbon atoms for a methine carbon atom bonding to the ester group (—COOCH$_3$), which correspond to the chain structures, M-E-E and E-E-M, and (e) no peak identified, which corresponds to the chain structure, E-E-E, and therefore, Ae is assumed to be zero.

Accordingly, the peak area, Ad, in this example is obtained from the following formula [4]:

$$Ad = (\text{peak area derived from a β-position methylene carbon atom} + \text{peak area derived from a γ-position methylene carbon atom}) \times 2/(2 \times 3) \quad [4].$$

A radical polymerization method in the present invention is not particularly limited as long as said method relates to a radical polymerization mechanism. Examples thereof are (1) a free-radical polymerization method, (2) a living-radical polymerization method with a reversible addition-fragmentation chain transfer, (3) a living-radical polymerization method with a stable radical, and (4) a living-radical polymerization method with a transition metal compound.

Examples of an initiator used in the above-mentioned free-radical polymerization method (1) are an azo initiator, a peroxide initiator, a substituent group-containing ethane initiator, a photopolymerization initiator, and an electron-transfer initiator.

Examples of the above-mentioned azo initiator are 2-(carbamoylazo)isobutyronitrile, 1,1'-azobis(cyclohexane-1-carbonitrile), 4,4'-azobis(4-cyanovaleric acid), 2,2'-azobisisobutyronitrile, 2,2'-azobis(2,4-dimethylvaleronitrile), 2,2'-azobis(4-methoxy-2,4-dimethylvaleronitrile), (2RS,2'RS)-azobis(4-methoxy-2,4-dimethylvaleronitrile), dimethyl 2,2'-azobis(2-methylpropionate), 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamidine) dihydrochloride, 2,2'-azobis{2-[N-(2-carboxyethyl)amidino]propane}n-hydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide], and 2,2'-azobis(2,4,4-trimethylpentane).

Examples of the above-mentioned peroxide initiator are dibenzoyl peroxide, di-t-butyl hydroperoxide, peroxy pivalates, dodecylbenzene peroxide, t-butylperacetate, acetyl peroxide, and lauroyl peroxide.

Examples of an initiator used in the above-mentioned living-radical polymerization method with a reversible addition-fragmentation chain transfer (2) are those exemplified above in the free-radical polymerization method (1), and dormant species. Regarding the dormant species, there are two methods: (i) one method comprising the steps of (i-1) preparing dormant species outside of a polymerization reactor, and (i-2) feeding said dormant species to a polymerization reactor, and (ii) another method comprising the step of feeding to a polymerization reactor a combination of the above-mentioned initiator in the free-radical polymerization method (1) such as 2,2'-azobisisobutyronitrile with a polymerization regulator such as a sulfur compound (for example, thioester), an iodine compound (for example, iodoform and ethyl 2-iodoacetate), an organic tellurium compound, and an organic antimony compound, thereby preparing dormant species in the polymerization reactor. When the dormant species is unstable species, the method (ii) is preferable because the method (ii) does not need to prepare such unstable dormant species outside of a polymerization reactor.

Examples of an initiator used in the above-mentioned living-radical polymerization method with a stable radical (3) are those exemplified above in the free-radical polymerization method (1), and dormant species particularly derived from a stable radical. Any of those initiators may be combined with an additive such as a nitroxide compound (for example, 2,2,6,6-tetramethyl-1-piperidinyloxy), and a cobalt porphyrin complex.

Examples of an initiator used in the above-mentioned living-radical polymerization method with a transition metal compound (4) are those exemplified above in the free-radical polymerization method (1), and an initiator composed of a transition metal compound and a transferable atom or atomic group-containing compound.

An example of the above-mentioned initiator composed of a transition metal compound and a transferable atom or atomic group-containing compound is an initiator composed of a metal complex (hereinafter referred to as "component (A)") of a metal compound containing a metal selected from the group consisting of metals belonging to Groups 8 to 12 in the periodic table (IUPAC 1985) and an organic halogen compound (hereinafter referred to as "component (B)"). The component (A) may be a combination of two or more kinds of said metal complexes.

The component (A) containing a ruthenium atom as a central metal atom is preferably dichlorotris(triphenylphosphine)ruthenium, dichlorotris(tributylphosphine)ruthenium, dichloro(cyclooctadiene)ruthenium, dichloro(benzene)ruthenium, dichloro-p-cymeneruthenium, dichloro(norbornadiene)ruthenium, cis-dichlorobis(2,2'-bipyridine)ruthenium, dichlorotris(1,10-phenanthrolin)ruthenium, (carbonyl)chloro(hydrido)tris(triphenylphosphine)ruthenium, chloro(cyclopentadienyl)bis(triphenylphosphine)ruthenium, chloro(pentamethylcyclopentadienyl)bis(triphenylphosphine) ruthenium, chloro(indenyl)bis(triphenylphosphine)ruthenium, chloro(2-N,N-dimethylaminoindenyl)bis(triphenylphosphine) ruthenium, (ethylene)indenylbis(triphenylphosphine)ruthenium(pentafluoro phenyl)borate, or (ethylene)indenylbis(triphenylphosphine)ruthenium tetrakis(3,5-bis(trifluoromethyl)phenyl)borate; or a combination of two or more thereof. Among them, more preferred is dichlorotris(triphenylphosphine)ruthenium, chloro(pentamethylcyclopentadienyl)bis(triphenylphosphine) ruthenium, chloro(indenyl)bis(triphenylphosphine)ruthenium, chloro(2-N,N-dimethylaminoindenyl)bis(triphenylphosphine) ruthenium, (ethylene)indenylbis(triphenylphosphine)ruthenium (pentafluoro phenyl)borate, or (ethylene)indenylbis (triphenylphosphine)ruthenium tetrakis(3,5-bis (trifluoromethyl)phenyl)borate, and further preferred is chloro (indenyl) bis (triphenylphosphine) ruthenium or ethylene(indenyl)bis(triphenylphosphine)ruthenium tetrakis(3, 5-bis(trifluoromethyl)phenyl)borate.

The component (A) containing an iron atom as a central metal atom is preferably a binuclear complex of an iron atom such as a dicarbonyl(cyclopentadienyl)iron dimer and a dicarbonyl(pentamethylcyclopentadienyl)irondimer; a ferrocene compound such as ferrocene, acetylferrocene, 1,1'-bis (diphenylphosphino)ferrocene, 1,1'-bis(diisopropylphosphino)ferrocene, bis(ethylcyclopentadienyl)iron, bis (pentamethylcyclopentadienyl)iron, bis (isopropylcyclopentadienyl)iron, bis (tetramethylcyclopentadienyl)iron, n-butylferrocene, tert-butylferrocene, α-(N,N-dimethylamino)ethylferrocene, N,N-dimethylaminomethylferrocene, 1,1'-dimethylferrocene, ethylferrocene, α-hydroxyethylferrocene, hydroxymethylferrocene, and 1,1'-diacetylferrocene; iron(II) acetate, iron(II) acetylacetonate, iron(II) bromide, iron(II) chloride, iron(II) iodide, iron(III) bromide, iron(III) chloride, (cyclohexadiene)irontricarbonyl; (cyclooctatetraene)irontricarbonyl; iron(II) phthalocyanine, dichlorobis(triphenylphosphine)iron; bromo(dicarbonyl)(cyclopentadienyl) iron; bromo(dicarbonyl)(pentamethylcyclopentadienyl)iron; dicarbonyl(cyclopentadienyl)iodoiron; dicarbonyl(pentamethylcyclopentadienyl)iodoiron; or a combination of two or more thereof. Among them, preferred is a dicarbonyl(cyclopentadienyl)iron dimer or a dicarbonyl(pentamethylcyclopentadienyl)iron dimer.

An example of the component (A) containing a cobalt atom as a central metal atom is cobaltocene.

An example of the component (A) containing a copper atom as a central metal atom is a complex, whose ligand containing an atom selected from the group consisting of atoms belonging to Groups 13 to 17 in the periodic table (IUPAC 1985) coordinates to the copper atom.

Examples of the component (B) are a halogenated hydrocarbon compound such as carbon tetrachloride, chloroform, dichloromethane, monochloroethane, trichlorophenylmethane, dichlorodiphenylmethane, monobromomethane, dibromomethane, tribromomethane, monoiodomethane, diiodomethane, iodoform, 1-chlorobutane, 2-chlorobutane, 1-chloro-2-methylpropane, 1-bromobutane, 2-bromobutane, 1-bromo-2-methylpropane, 1-iodobutane, 2-iodobutane, and 1-iodo-2-methylpropane; an α-halogenocarbonyl compound such as 2,2,2-trichloroacetone and 2,2-dichloroacetophenone; an α-halogenocarboxylic ester such as ethyl 2-chloroacetate, ethyl 2-bromoacetate, ethyl 2-iodoacetate, methyl 2-iodopropionate, methyl 2,2,2-trichloroacetate, methyl 2,2-dichloroacetate, methyl 2-chloropropionate, ethyl 2-bromo-2-methylpropionate, ethyl 2-iodo-2-methylpropionate, ethyl 2-bromopropionate, ethyl 2-iodopropionate, dimethyl 2-chloro-2,4,4-trimethylglutarate, dimethyl 2-iodo-2,4,4-trimethylglutarate, 1,2-bis(2'-bromo-2'-methylpropionyloxy) ethane, 1,2-bis(2'-iodo-2'-methylpropionyloxy)ethane, 1,2-bis(2'-bromopropionyloxy)ethane, 1,2-bis(2'-iodopropionyloxy)ethane, 2-(2'-bromo-2'-methylpropionyloxy)ethyl alcohol, and 2-(2'-iodo-2'-methylpropionyloxy)ethyl alcohol; and a (1-halogenoalkyl) benzene derivative such as 1-bromo-1-phenylethane, 4-(1-bromoethyl)benzoic acid, and 4-(1-bromoethyl)benzoic ester; and a combination of two or more thereof. Among them, preferred is a halogenated hydrocarbon compound, an α-halogenocarbonyl compound, or an α-halogenocarboxylic ester, and more preferred is ethyl 2-bromo-2-methylpropionate, ethyl 2-iodopropionate, or 2-iodobutane.

A polar monomer-olefin copolymer of the present invention is a random copolymer, which can be produced according to the process-1 comprising the step of radically copolymerizing 100 parts by mol of an olefin with 1 to 100 parts by mol, and preferably 25 to 2.5 parts by mol of a polar monomer from a viewpoint of productivity of said copolymer, or according to the process-2 comprising the step of radically copolymerizing an olefin having a concentration in a polymerization reactor of 0.04 to 100 mol/liter with a polar monomer having a concentration therein of 0.01 to 25 mol/liter.

In the process-1, the amount of the olefin, "100 parts by mol", and the amount of the polar monomer, "1 to 100 parts by mol", mean the total amounts of respective monomers supplied to a polymerization reactor throughout the entire polymerization, respectively, and therefore, respective monomers are supplied to the polymerization reactor in a lump at the beginning of polymerization, or are supplied thereto continuously or discontinuously in fractional amounts.

In the process-2, the concentration of the olefin, "0.04 to 100 mol/liter", and the concentration of the polar monomer, "0.01 to 25 mol/liter" mean their initial concentrations in the polymerization reactor, respectively. Further olefin and/or further polar monomer may be added to the polymerization reactor continuously or discontinuously throughout the entire polymerization, independently of the above-mentioned initial concentrations.

When the amount of the polar monomer is not within the range of 1 to 100 parts by mol per 100 parts by mol of the olefin in the process-1, or when the initial concentration of the olefin is not within the range of 0.04 to 100 mol/liter in the process-2, or the initial concentration of the polar monomer is not within the range of 0.01 to 25 mol/liter therein, there cannot be produced a polar monomer-olefin copolymer, which comprises a polar monomer unit in an amount of 50 to 75% by mol, and an olefin unit in an amount of 25 to 50% by mol, and contains a main chain structure consisting of two or more olefin units, wherein the total amount of the polar monomer unit and the olefin unit is 100% by mol. Particularly, when the amount of the polar monomer is smaller than 1 part by mol per 100 parts by mol of the olefin in the process-1, or when the concentration of the polar monomer is lower than 0.01 mol/liter in the process-2, the copolymerization rate may be too slow, and when the amount of the polar monomer is larger than 100 parts by mol per 100 parts by mol of the olefin in the process-1, or when the concentration of the polar monomer is higher than 25 mol/liter in the process-2, the olefin may not be copolymerized.

Feeding each of a polar monomer and an olefin in the amount defined in the process of the present invention can produce a polar monomer-olefin copolymer comprising a polar monomer unit in an amount of 50 to 75% by mol and an olefin unit in an amount of 25 to 50% by mol, and containing a main chain structure consisting of two or more olefin units, wherein the total amount of the polar monomer unit and the olefin unit is 100% by mol. The process of the present invention can produce a polar monomer-olefin copolymer comprising a polar monomer unit in an amount of preferably 55 to 70% by mol and an olefin unit in an amount of preferably 30 to 45% by mol, the total amount of both units being 100% by mol, from a viewpoint of (i) easy production of said copolymer and (ii) a good balance between an amount of the olefin unit contained in said copolymer and an amount of the main chain structure consisting of two or more olefin units contained therein.

Feeding each of a polar monomer and an olefin in the amount defined in the process of the present invention can control an amount of a main chain structure consisting of two or more olefin units contained in said copolymer. In order to produce a polar monomer-olefin copolymer having an improved water resistance (one of characteristics of an olefin polymer), the amount of a main chain structure consisting of two or more olefin units is preferably 4.0 to 50% by mol, more preferably 6.0 to 40% by mol, and further preferably 10 to 30% by mol, wherein the total amount of a polar monomer unit and an olefin unit is 100% by mol.

A $^{13}$C-NMR analysis of a polar monomer-olefin copolymer in the present invention with an equipment having an observation frequency of nearly 67.5 MHz shows no existence of a short chain-branched structure derived from the olefin, which usually exists in a polyolefin produced according to a high-pressure polymerization of an olefin, for example, a short chain-branched structure such as an ethyl group or a butyl group derived from ethylene, which usually exists in a low-density polyethylene produced according to a high-pressure polymerization of ethylene.

A molecular weight of a polar monomer-olefin copolymer in the present invention can be controlled by changing an initial concentration of respective monomers fed to a polymerization reactor. For example, feeding methyl acrylate having an initial concentration of 1 mol/liter or higher can produce a polar monomer-olefin copolymer having a weight average molecular weight of 10,000 or larger, which is a preferable weight average molecular weight in view of processability of a copolymer produced.

Feeding each of a polar monomer and an olefin in the amount defined in the process of the present invention can produce a polar monomer-olefin copolymer having a molecular weight distribution of preferably 1.0 to 5.0, and more preferably 1.0 to 2.5, which is defined as a ratio of its weight average molecular weight (Mw) to its number average molecular weight (Mn), Mw/Mn. Said molecular weight distribution can be changed by devising a method such as a method for adding a reagent (monomers, etc.) and a method for controlling a polymerization temperature. There can be produced a polar monomer-olefin copolymer having a molecular weight distribution (Mw/Mn) of, for example, smaller than 1.6 by (1) adding an additive in an amount of generally 1 to 50 mmol/liter, the additive being mainly selected from a series of compounds used for controlling living-radical polymerization, (2) adding monomers in a relatively low concentration (usually, 1 to 4 mol/liter), and (3) keeping a polymerization temperature and pressure and a concentration of respective components in as small fluctuation as possible. On the other hand, there can be produced a polar monomer-olefin copolymer having a molecular weight distribution (Mw/Mn) of, for example, larger than 3.0 by (1) adding monomers in a relatively high concentration (usually, 8 mol/liter or higher), and (2) changing a polymerization temperature and a concentration of respective components during polymerization.

An initiator in the above-mentioned free-radical polymerization method (1) is fed to a polymerization reactor in a concentration (initial concentration) of generally 0.01 to 1,000 mmol/liter, and preferably 0.1 to 100 mmol/liter from a viewpoint of productivity of a copolymer produced. When said concentration is lower than 0.01 mmol/liter, a copolymerization rate may be too slow, and when said concentration is higher than 1,000 mmol/liter, there may occur too many undesirable side reactions such as a termination reaction.

An initiator in the above-mentioned living-radical polymerization method with a reversible addition-fragmentation chain transfer (2) is fed to a polymerization reactor in a concentration (initial concentration) of generally 0.01 to 100 mmol/liter, and preferably 0.1 to 40 mmol/liter from a viewpoint of a molecular weight distribution of a copolymer produced. When said concentration is lower than 0.01 mmol/liter, a copolymerization rate may be too slow, and when said concentration is higher than 100 mmol/liter, there may occur too many undesirable side reactions such as a termination reaction.

The above-mentioned polymerization regulator is fed to a polymerization reactor in a concentration (initial concentration) of generally 0.01 to 2,000 mmol/liter, and preferably 0.1 to 500 mmol/liter from a viewpoint of a balance between productivity of a copolymer produced and polymerization controllability. When said concentration is lower than 0.01 mmol/liter, it may be difficult to produce a copolymer having a narrow molecular weight distribution, and when said concentration is higher than 2,000 mmol/liter, a copolymerization rate may be too slow.

An initiator in the above-mentioned living-radical polymerization method with a stable radical (3) is fed to a polymerization reactor in a concentration (initial concentration) of generally 0.01 to 100 mmol/liter, and preferably 0.1 to 40 mmol/liter from a viewpoint of a balance between productivity of a copolymer produced and polymerization controllability. The above-mentioned additive optionally combined with said initiator is fed to a polymerization reactor in a concentration (initial concentration) of generally 0.01 to 2,000 mmol/liter, and preferably 0.1 to 500 mmol/liter from a viewpoint of a balance between productivity of a copolymer produced and polymerization controllability. When said concentration of the initiator is lower than 0.01 mmol/liter, a copolymerization rate may be too slow, and when said concentration thereof is higher than 100 mmol/liter, there may occur too many undesirable side reactions such as a termination reaction. When said concentration of the additive is lower than 0.01 mmol/liter, it may be difficult to produce a copolymer having a narrow molecular weight distribution, and when said concentration thereof is higher than 2,000 mmol/liter, a copolymerization rate may be too slow.

The component (A) in the above-mentioned living-radical polymerization method with a transition metal compound (4) is fed to a polymerization reactor in a concentration (initial concentration) of preferably 0.01 to 100 mmol/liter, and more preferably 0.1 to 40 mmol/liter, from a viewpoint of a balance between productivity of a copolymer produced and polymerization controllability. The component (B) therein is fed to a polymerization reactor in a concentration (initial concentration) of preferably 0.1 to 100 mmol/liter, and more preferably 0.5 to 60 mmol/liter, from a viewpoint of a balance between productivity of a copolymer produced and polymerization controllability. When said concentration of the component (A) is lower than 0.01 mmol/liter, it may be difficult to control a copolymerization rate, and when said concentration thereof is higher than 100 mmol/liter, a copolymerization rate may be too slow. When said concentration of the component (B) is lower than 0.1 mmol/liter, productivity of a copolymer may be low, and when said concentration thereof is higher than 100 mmol/liter, a copolymer may have a low molecular weight.

The component (A) may be combined with an additive such as a Lewis acid and an amine compound. Said additive is fed to a polymerization reactor in a concentration (initial concentration) of preferably 0.5 to 1,000 mmol/liter, and more preferably 1 to 60 mmol/liter.

The process of the present invention is carried out at a copolymerization temperature of generally −30 to 300° C., preferably 0 to 280° C. and more preferably 20 to 250° C. from a viewpoint of productivity of a copolymer and easy production thereof. When said temperature is higher than 300° C., a copolymer once produced may be decomposed easily. Particularly preferable copolymerization temperature is room temperature to about 60° C., because the process of the present invention can be carried out with a relatively convenient apparatus.

A copolymerization pressure in the process of the present invention is not particularly limited. When the olefin is ethylene, the pressure is preferably atmospheric pressure to 40 MPa, more preferably 2 to 20 MPa, and further preferably 4 to 10 MPa, from a viewpoint of productivity of a copolymer and easy production thereof. When said pressure is lower than atmospheric pressure, it may be difficult to promote a copolymerization, and when said pressure is higher than 40 MPa, it may be difficult to carry out the process of the present invention with a generalized apparatus.

A copolymerization time in the process of the present invention is generally determined properly depending on conditions such as a kind of a copolymer produced and a polymerization reactor, and is usually 15 seconds to 40 hours.

A copolymerization system in the process of the present invention is not particularly limited. Examples thereof are a continuous copolymerization system and a batch-wise copolymerization system.

A copolymerization method in the process of the present invention is not particularly limited. Examples thereof are a slurry copolymerization method, a solution copolymerization method, and a gas-phase copolymerization method. An example of a solvent in a copolymerization method using the solvent is an inert hydrocarbon solvent such as propane, pentane, hexane, heptane and octane.

The process of the present invention may use a chain transfer agent such as hydrogen in order to regulate a molecular weight of a copolymer produced.

An example of a representative use of the polar monomer-olefin copolymer in the present invention is a use as an acrylic rubber having an improvement in its physical property such as water resistance and low-temperature resistance.

EXAMPLE

The present invention is explained with reference to the following Examples, which do not limit the scope of the present invention.

Example 1

A stainless-steel 400 mL-autoclave was thoroughly dried, and then purged with nitrogen gas. There were put in the autoclave with a syringe at a room temperature and an atmospheric pressure 9 mL of methyl acrylate (polar monomer) manufactured by Tokyo Kasei Kogyo Co. Ltd., and 90 mL of purified toluene (polymerization solvent), respectively, and then, 657 mg of 2,2'-azobisisobutylonitrile (initiator) manufactured by Wako Pure Chemical Industries, Ltd. was put therein. Further, ethylene gas (olefin) was put therein under pressure up to 4.6 MPa. The mixture was heated up to 60° C., and then, was copolymerized for 30 minutes, wherein the pressure in the autoclave rose together with said heating up to 60° C., and reached a final pressure of 7.4 MPa. After completion of the copolymerization, remaining ethylene gas was purged, and then, the solvent contained in the copolymerization reaction mixture was distilled away under reduced pressure, thereby obtaining a copolymer. The copolymer was dried for about 3 hours at a room temperature, and 1.4 g of the dried copolymer was obtained.

The copolymer was analyzed, and was found to have (i) a weight average molecular weight (Mw) of 25,800, and a number average molecular weight (Mn) of 8,800, in terms of a weight average molecular weight of a standard polystyrene and a number average molecular weight thereof, (ii) a molecular weight distribution shown by a single peak, and (iii) a single glass transition temperature of −19.8° C. The molecular weight distribution (Mw/Mn) was calculated to be 25,800/8,800=2.9.

The copolymer was also analyzed according to the above-mentioned $^{13}$C-NMR analysis, and the following peaks were identified in its $^{13}$C-NMR spectrum, wherein "M" and "E" are a methyl acrylate unit and an ethylene unit, respectively:

(a) a peak at nearly 41.4 ppm derived from the methine carbon atom bonding to the ester group (—COOCH$_3$), which corresponds to the chain structure, M-M-M, (b) a peak at nearly 43.2 ppm derived from the methine carbon atom bonding to the ester group (—COOCH$_3$), which corresponds to the chain structures, E-M-M and M-M-E, (c) a peak at 45.2 ppm derived from the methine carbon atom bonding to the ester group (—COOCH$_3$), which corresponds to the chain structure, E-M-E, (d) two peaks at nearly 27.0 ppm and 29.3 ppm derived from the methylene carbon atom, which corresponds to the chain structures, M-E-E and E-E-M, and (e) no peak identified, which corresponds to the chain structure, E-E-E.

Peak areas of the above-identified respective peaks were measured, and the measured respective peak areas were converted into the areas per one carbon atom, thereby obtaining converted peak areas of Aa (300.00), Ab (483.21), Ac (215.72), Ad (190.29) and Ae (0.00), which correspond to the above-mentioned chain structures (a) to (e), respectively, wherein the reason for Ae being 0.00 was that no peak was identified.

The above converted peak areas of Aa (300.00), Ab (483.21), Ac (215.72), Ad (190.29) and Ae (0.00) were assigned to the above-mentioned formulas [1] and [2], thereby obtaining an amount of an ethylene unit of 36% by mol, and an amount of a chain structure consisting of two or more ethylene units of 12% by mol, the total amount of the ethylene unit and the methyl acrylate unit being 100% by mol. The above-obtained amount of the ethylene unit was assigned to the above-mentioned formula [3], thereby obtaining an amount of a methyl acrylate unit of 64% by mol.

The above $^{13}$C-NMR spectrum showed existence of an ester group (—COOCH$_3$ group) derived from methyl acrylate, but showed no existence of a short chain-branched structure such as an ethyl group and a butyl group derived from ethylene.

Based on the above, it was determined that the above-obtained copolymer was a methyl acrylate-ethylene copolymer containing 36% by mol of the ethylene unit, 64% by mol of the methyl acrylate unit, and 12% by mol of the chain structure consisting of two or more ethylene units.

Results are summarized in Table 1, wherein respective amounts of "monomer used" and "initiator used" are converted into those represented by "part by mol", "mol/liter" and "mmol/liter".

The above-mentioned weight average molecular weight (Mw) and number average molecular weight (Mn) were measured according to a gel permeation chromatography (GPC)

under the below-mentioned conditions, wherein a calibration curve was prepared using standard polystyrenes:
- equipment of TYPE 150CV manufactured by Milipore Waters Co., Ltd.;
- column of SHODEX M/S 80;
- measurement temperature of 145° C.;
- solvent of o-dichlorobenzene; and
- sample concentration of 5 mg/8 mL.

The above-mentioned glass transition temperature was determined according to a differential scanning calorimetry (DSC) with an equipment of DSC-VII manufactured by Perkin-Elmer under the below-mentioned conditions:
- heating from 20 to 200° C. at a rate of 20° C./minute, and keeping at 200° C. for 10 minutes; then,
- cooling from 200 to −100° C. at a rate of 20° C./minute, and keeping at −100° C. for 10 minutes; and then,
- measuring under heating from −100 to 300° C. at a rate of 20° C./minute.

Example 2

A stainless-steel 400 mL-autoclave was thoroughly dried, and then purged with nitrogen gas. There were put in the autoclave with a syringe at a room temperature and an atmospheric pressure 18 mL of methyl acrylate (polar monomer) manufactured by Tokyo Kasei Kogyo Co. Ltd., and 180 mL of purified toluene (polymerization solvent), respectively. The mixture was heated up to 60° C., and ethylene gas (olefin) was put therein under pressure up to 5.0 MPa. Further, 1.31 g of 2,2'-azobisisobutylonitrile (initiator) manufactured by Wako Pure Chemical Industries, Ltd. was put therein, and then, the mixture was copolymerized for 4 hours. After completion of the copolymerization, remaining ethylene gas was purged, and then, the solvent contained in the copolymerization reaction mixture was distilled away under reduced pressure, thereby obtaining a copolymer. The copolymer was dried for about 4 hours at a room temperature, and 6.71 g of the dried copolymer was obtained.

The copolymer was analyzed, and was found to have (i) a weight average molecular weight (Mw) of 5,400, and a number average molecular weight (Mn) of 2,400, in terms of a weight average molecular weight of a standard polystyrene and a number average molecular weight thereof, (ii) a molecular weight distribution shown by a single peak, and (iii) a single glass transition temperature of −23.5° C. The molecular weight distribution (Mw/Mn) was calculated to be 5,400/2,400=2.3.

The copolymer was also analyzed according to the above-mentioned $^{13}$C-NMR analysis, thereby obtaining converted peak areas of Aa (497.66), Ab (414.27), Ac (88.01), Ad (91.31) and Ae (0.00).

The above converted peak areas of Aa to Ae were assigned to the above-mentioned formulas [1] and [2], thereby obtaining an amount of an ethylene unit of 25% by mol, and an amount of a chain structure consisting of two or more ethylene units of 6.8% by mol, the total amount of the ethylene unit and the methyl acrylate unit being 100% by mol. The above-obtained amount of the ethylene unit was assigned to the above-mentioned formula [3], thereby obtaining an amount of a methyl acrylate unit of 75% by mol.

The above $^{13}$C-NMR spectrum showed existence of an ester group (—COOCH$_3$ group) derived from methyl acrylate, but showed no existence of a short chain-branched structure such as an ethyl group and a butyl group derived from ethylene.

Based on the above, it was determined that the above-obtained copolymer was a methyl acrylate-ethylene copolymer containing 25% by mol of the ethylene unit, 75% by mol of the methyl acrylate unit, and 6.8% by mol of the chain structure consisting of two or more ethylene units.

Results are summarized in Table 1.

Example 3

Example 1 was repeated except that (1) the ethylene gas pressure of 4.6 MPa was changed to 4.7 MPa, thereby obtaining a final pressure of 8.0 MPa, and (2) the copolymerization time of 30 minutes was changed to 1 hour, thereby obtaining 2.05 g of a dried copolymer.

The copolymer was analyzed, and was found to have (i) a weight average molecular weight (Mw) of 14,400, and a number average molecular weight (Mn) of 7,500, in terms of a weight average molecular weight of a standard polystyrene and a number average molecular weight thereof, (ii) a molecular weight distribution shown by a single peak, and (iii) a single glass transition temperature of −19.7° C. The molecular weight distribution (Mw/Mn) was calculated to be 14,400/7,500=1.9.

The copolymer was also analyzed according to the above-mentioned $^{13}$C-NMR analysis, thereby obtaining converted peak areas of Aa (287.61), Ab (486.25), Ac (176.02), Ad (191.24) and Ae (0.00).

The above converted peak areas of Aa to Ae were assigned to the above-mentioned formulas [1] and [2], thereby obtaining an amount of an ethylene unit of 34% by mol, and an amount of a chain structure consisting of two or more ethylene units of 13% by mol, the total amount of the ethylene unit and the methyl acrylate unit being 100% by mol. The above-obtained amount of the ethylene unit was assigned to the above-mentioned formula [3], thereby obtaining an amount of a methyl acrylate unit of 66% by mol.

The above $^{13}$C-NMR spectrum showed existence of an ester group (—COOCH$_3$ group) derived from methyl acrylate, but showed no existence of a short chain-branched structure such as an ethyl group and a butyl group derived from ethylene.

Based on the above, it was determined that the above-obtained copolymer was a methyl acrylate-ethylene copolymer containing 34% by mol of the ethylene unit, 66% by mol of the methyl acrylate unit, and 13% by mol of the chain structure consisting of two or more ethylene units.

Results are summarized in Table 1.

Example 4

A stainless-steel 400 mL-autoclave was thoroughly dried, and then purged with nitrogen gas. There were put in the autoclave with a syringe at a room temperature and an atmospheric pressure 354 mg of dicarbonylcyclopentadienyliron dimer (component (A)) manufactured by Aldrich, 18 ml of methyl acrylate (polar monomer) manufactured by Tokyo Kasei Kogyo Co. Ltd., and 80 mL of purified toluene (polymerization solvent), respectively, and then, ethylene gas (olefin) was put therein under pressure up to 4.6 MPa, and further, 0.5 mL of a toluene solution of methyl 2-iodopropionate (component (B)) having a concentration of 1 mol/liter was put therein. The mixture was heated up to 60° C. over about 10 minutes, and then, was copolymerized for 15 minutes, wherein the pressure in the autoclave rose along with said heating up to 60° C., and reached a final pressure of 7.6 MPa. After completion of the copolymerization, remaining ethylene gas was purged, and then, the solvent contained in the copolymerization reaction mixture was distilled away under reduced pressure, thereby obtaining a copolymer. The copolymer was dried for about 3 hours at a room temperature, and 3.73 g of the dried copolymer was obtained.

The copolymer was analyzed, and was found to have (i) a weight average molecular weight (Mw) of 13,600, and a number average molecular weight (Mn) of 7,900, in terms of a weight average molecular weight of a standard polystyrene and a number average molecular weight thereof, (ii) a molecular weight distribution shown by a single peak, and (iii) a single glass transition temperature of −26.6° C. The molecular weight distribution (Mw/Mn) was calculated to be 13,600/7,900=1.7.

The copolymer was also analyzed according to the above-mentioned $^{13}$C-NMR analysis, thereby obtaining converted peak areas of Aa (227.65), Ab (334.37), Ac (128.97), Ad (201.00) and Ae (0.00).

The above converted peak areas of Aa to Ae were assigned to the above-mentioned formulas [1] and [2], thereby obtaining an amount of an ethylene unit of 34% by mol, and an amount of a chain structure consisting of two or more ethylene units of 18% by mol, the total amount of the ethylene unit and the methyl acrylate unit being 100% by mol. The above-obtained amount of the ethylene unit was assigned to the above-mentioned formula [3], thereby obtaining an amount of a methyl acrylate unit of 66% by mol.

The above $^{13}$C-NMR spectrum showed existence of an ester group (—COOCH$_3$ group) derived from methyl acrylate, but showed no existence of a short chain-branched structure such as an ethyl group and a butyl group derived from ethylene.

Based on the above, it was determined that the above-obtained copolymer was a methyl acrylate-ethylene copolymer containing 34% by mol of the ethylene unit, 66% by mol of the methyl acrylate unit, and 18% by mol of the chain structure consisting of two or more ethylene units.

Results are summarized in Table 1.

The invention claimed is:

1. A polar monomer-olefin copolymer, which:
comprises a polar monomer unit in an amount of 50 to 75% by mol, and an olefin unit in an amount of 25 to 36% by mol, the total amount of both units being 100% by mol; and
contains 6.8 to 18% by mol of a main chain structure consisting of two or more olefin units, wherein said two or more olefin units are linked directly to one another, and wherein the olefin unit is an ethylene unit, and wherein the polar monomer unit is an acrylic ester unit, and wherein glass transition temperature of the polar monomer-olefin copolymer is −19.7° C. to −26.6° C.

2. The polar monomer-olefin copolymer according to claim 1, wherein the polar monomer-olefin copolymer has no short-chain branched structure derived from the olefin.

3. The polar monomer-olefin copolymer according to claim 1, wherein the main chain structure consisting of two or more olefin units is contained in an amount of 4.0 to 50% by mol, the total amount of the polar monomer unit and the olefin unit being 100% by mol.

4. A process for producing a polar monomer-olefin copolymer, which:
comprises a polar monomer unit in an amount of 64 to 75% by mol, and an olefin unit in an amount of 25 to 36% by mol, the total amount of both units being 100% by mol, and
contains 6.8 to 18% by mol of a main chain structure consisting of two or more olefin units;
the process comprising the step of radically copolymerizing 100 parts by mol of an olefin with 1 to 100 parts by mol of a polar monomer,
wherein said two or more olefin units are linked directly to one another, and wherein the olefin and the polar monomer exist concurrently in the copolymerization step, and wherein the olefin unit is an ethylene unit, and wherein the polar monomer unit is an acrylic ester unit, and

TABLE 1

|  | Example | | | |
| --- | --- | --- | --- | --- |
|  | 1 | 2 | 3 | 4 |
| Monomer used | | | | |
| Ethylene in solution (part by mol) | 100 | 100 | 100 | 100 |
| Methyl acrylate (part by mol) | 4 | 14 | 3 | 8 |
| Ethylene in solution (mol/liter) | 25 | 7 | 29 | 26 |
| Methyl acrylate (mol/liter) | 1 | 1 | 1 | 2 |
| Initiator used | | | | |
| 2,2'-Azobisisobutylonitrile (mmol/liter) | 20 | 20 | 20 | |
| Component (A) (mmol/liter) | | | | 20 |
| Component (B) (mmol/liter) | | | | 20 |
| Copolymerization | | | | |
| Temperature (° C.) | 60 | 60 | 60 | 60 |
| Time (minutes) | 30 | 240 | 60 | 15 |
| Methyl acrylate-ethylene copolymer produced | | | | |
| Mw | 25,800 | 5,400 | 14,400 | 13,600 |
| Mn | 8,800 | 2,400 | 7,500 | 7,900 |
| Mw/Mn | 2.9 | 2.3 | 1.9 | 1.7 |
| Glass transition temperature (° C.) | −19.8 | −23.5 | −19.7 | −26.6 |
| Amount of a methyl acrylate unit (% by mol) | 64 | 75 | 66 | 66 |
| Amount of an ethylene unit (% by mol) | 36 | 25 | 34 | 34 |
| Amount of a chain structure consisting of two or more ethylene units (% by mol) | 12 | 6.8 | 13 | 18 | wherein glass transition temperature of the polar monomer-olefin copolymer is −19.7° C. to −26.6° C.

5. The process for producing a polar monomer-olefin copolymer according to claim 4,
wherein the polar monomer-olefin copolymer has no short-chain branched structure derived from the olefin.

6. The process for producing a polar monomer-olefin copolymer according to claim 4,
wherein the main chain structure consisting of two or more olefin units is contained in an amount of 4.0 to 50% by mol, the total amount of the polar monomer unit and the olefin unit being 100% by mol.

7. A process for producing a polar monomer-olefin copolymer, which:
comprises a polar monomer unit in an amount of 64 to 75% by mol, and an olefin unit in an amount of 25 to 36% by mol, the total amount of both units being 100% by mol; and
contains 6.8 to 18% by mol of a main chain structure consisting of two or more olefin units;
the process comprising the step of radically copolymerizing an olefin having a concentration in a polymerization reactor of 0.04 to 100 mol/liter with a polar monomer having a concentration therein of 0.01 to 25 mol/liter,
wherein said two or more olefin units are linked directly to one another, and wherein the olefin and the polar monomer exist concurrently in the copolymerization step, and wherein the olefin unit is an ethylene unit, and wherein the polar monomer unit is an acrylic ester unit, and wherein glass transition temperature of the polar monomer-olefin copolymer is −19.7° C. to −26.6° C.

8. The process for producing a polar monomer-olefin copolymer according to claim 7, wherein the polar monomer-olefin copolymer has no short-chain branched structure derived from the olefin.

9. The process for producing a polar monomer-olefin copolymer according to claim 7,
wherein the main chain structure consisting of two or more olefin units is contained in an amount of 4.0 to 50% by mol, the total amount of the polar monomer unit and the olefin unit being 100% by mol.

* * * * *